I. Landis,
Saddle Tree.
No. 99,447.   Patented Feb. 1, 1870.
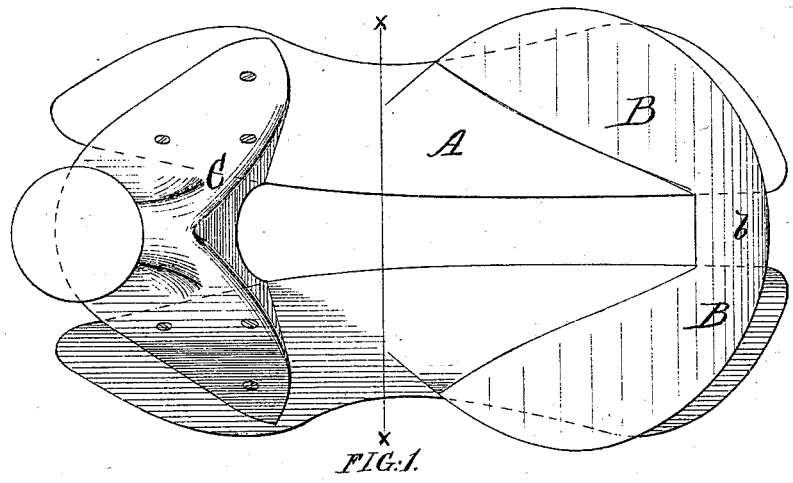
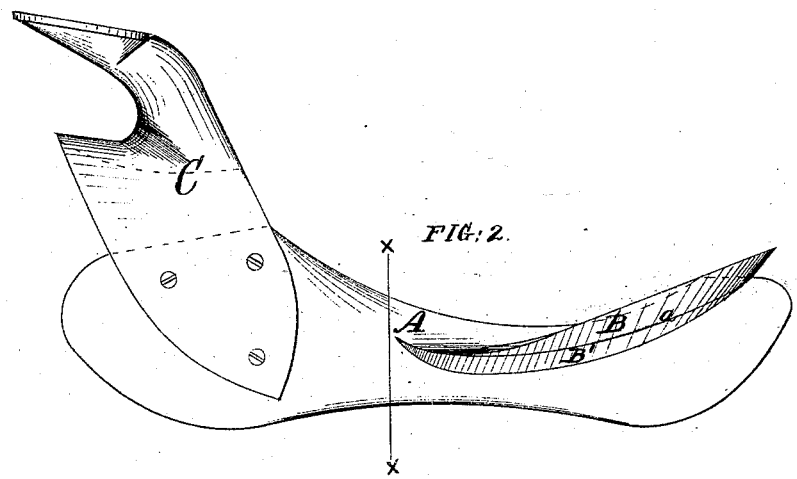
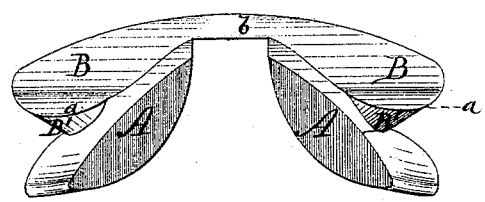
WITNESSES.
INVENTOR.
Israel Landis
BY T. C. Theaker
his attorney.

United States Patent Office.

ISRAEL LANDIS, OF ST. JOSEPH, MISSOURI.

Letters Patent No. 99,447, dated February 1, 1870.

IMPROVEMENT IN SADDLE-TREES.

The Schedule referred to in these Letters Patent and making part of the same.

*To all whom it may concern:*

Be it known that I, ISRAEL LANDIS, of Saint Joseph, in the county of Buchanan, and State of Missouri, have invented a new and useful Improvement in Saddle-Trees; and I do hereby declare that the following is a full, clear, and exact description thereof, sufficient to enable those skilled in the art to which my invention appertains, to make and use the same.

The nature of my invention consists in constructing a saddle-tree with Mexican bars formed with flat surfaces thereon, for the reception of an English seat, and also in the peculiar form of the seat, and the manner of attaching it to the bars.

In the drawings—

Figure 1 is a plan or top view of my improved saddle-tree.

Figure 2 is a side elevation.

Figure 3 is a transverse vertical section, taken in the line $x$ $x$ of figs. 1 and 2.

The bars A A are made of any desired length and breadth, and their under sides are so formed as to fit the back of a horse as nearly as possible; and on their upper sides, from any desired point at or near their centre, longitudinally, to a point near their rear ends, are formed raised projections, as seen at B' in figs. 2 and 3. The upper surfaces of said projections are planes to which to fit and attach the seat, as seen in said figures.

The seat B is formed in one piece, with two flat surfaces on its under side, one on each wing or side, as seen at $a$, figs. 2 and 3, to fit closely to the flat surfaces of the raised parts of the bars A A, to which it is firmly attached. The seat B, being formed in one piece, when attached to the bars A A, as described, forms a rigid connection between said bars at and near their rear ends. They may be attached or connected together at their forward ends by any desired pommel, this connection also being rigid.

The outer edge of the seat describes about three-fourths of a circle; but it may be made of any desired form in this regard. Its upper side is formed sloping slightly, more or less, as desired, from its outer edge toward its centre, forming a concave surface. The back part of the seat forms the cantel for connecting the bars together at their rear ends, as seen at $b$, in figs. 1 and 3. The plane joint by which the seat and bars are connected together insures great strength; and the peculiar construction of the entire tree secures comfort and ease to both horse and rider.

What I claim as new, and desire to secure by Letters Patent, is—

The Mexican bars A A, formed with raised projections and plane surfaces B', in combination with the flat English seat and cantel B, when made in the form, and connected together in the manner shown and described.

ISRAEL LANDIS.

Witnesses:
    R. S. MONROE,
    BENJ. F. LANDIS.